United States Patent
Epworth et al.

(10) Patent No.: US 7,272,327 B2
(45) Date of Patent: Sep. 18, 2007

(54) MULTI-DETECTOR DETECTION OF OPTICAL SIGNALS

(75) Inventors: Richard Epworth, Sawbridgeworth (GB); Peter Anslow, Bishops Stortford (GB); Christopher R Fludger, Cambridge (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 516 days.

(21) Appl. No.: 10/425,808

(22) Filed: Apr. 29, 2003

(65) Prior Publication Data

US 2004/0218932 A1 Nov. 4, 2004

(51) Int. Cl.
*H04B 10/08* (2006.01)

(52) U.S. Cl. .................... 398/212; 398/208
(58) Field of Classification Search .............. 398/205, 398/212–214, 209, 208
See application file for complete search history.

(56) References Cited

U.S. PATENT DOCUMENTS

| | | | |
|---|---|---|---|
| 5,949,560 A * | 9/1999 | Roberts et al. | 398/29 |
| 6,486,984 B1 * | 11/2002 | Baney et al. | 398/212 |
| 6,941,079 B1 * | 9/2005 | Barozzi et al. | 398/157 |
| 7,076,168 B1 * | 7/2006 | Shattil | 398/76 |
| 2002/0131135 A1 * | 9/2002 | Chow et al. | 359/189 |
| 2002/0149814 A1 * | 10/2002 | Sorin | 359/110 |
| 2002/0176132 A1 * | 11/2002 | Sarraf | 359/124 |
| 2004/0208618 A1 * | 10/2004 | Roberts et al. | 398/158 |

* cited by examiner

*Primary Examiner*—Leslie Pascal
(74) *Attorney, Agent, or Firm*—Barnes & Thornburg LLP

(57) ABSTRACT

Use in an optical communications system of multiple detectors to separately detect respective multiple spectral modes of a received optical signal. The invention also provides for corresponding multi-channel, dispersion-tolerant optical receivers. Embodiments are presented both for direct detection and for coherent detection of optical signals.

21 Claims, 14 Drawing Sheets

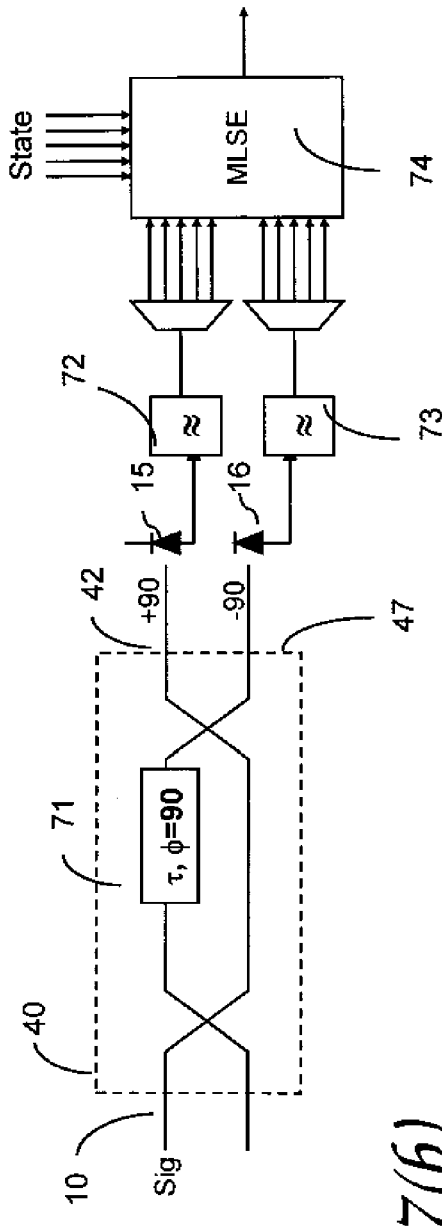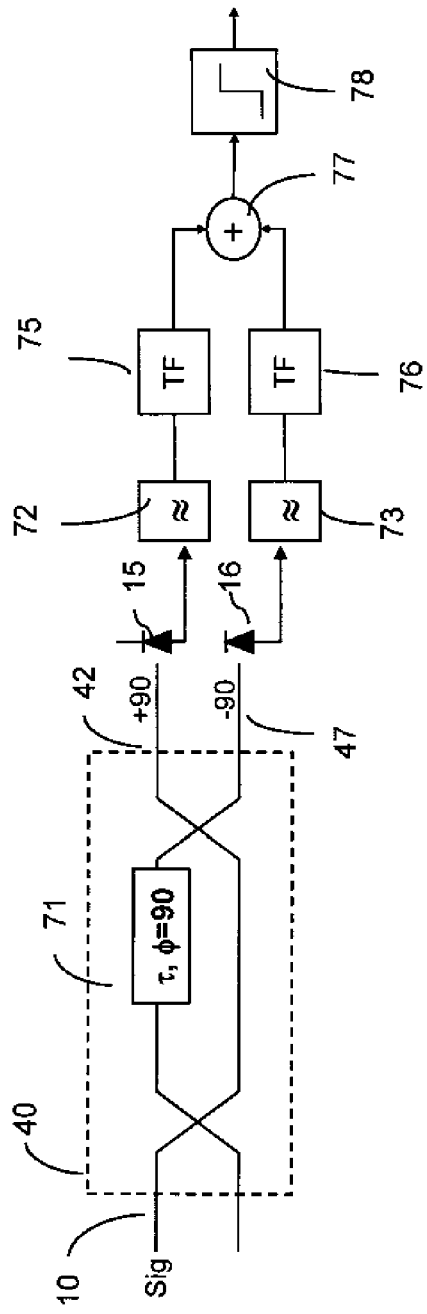
Fig. 7(a)
Fig. 7(b)

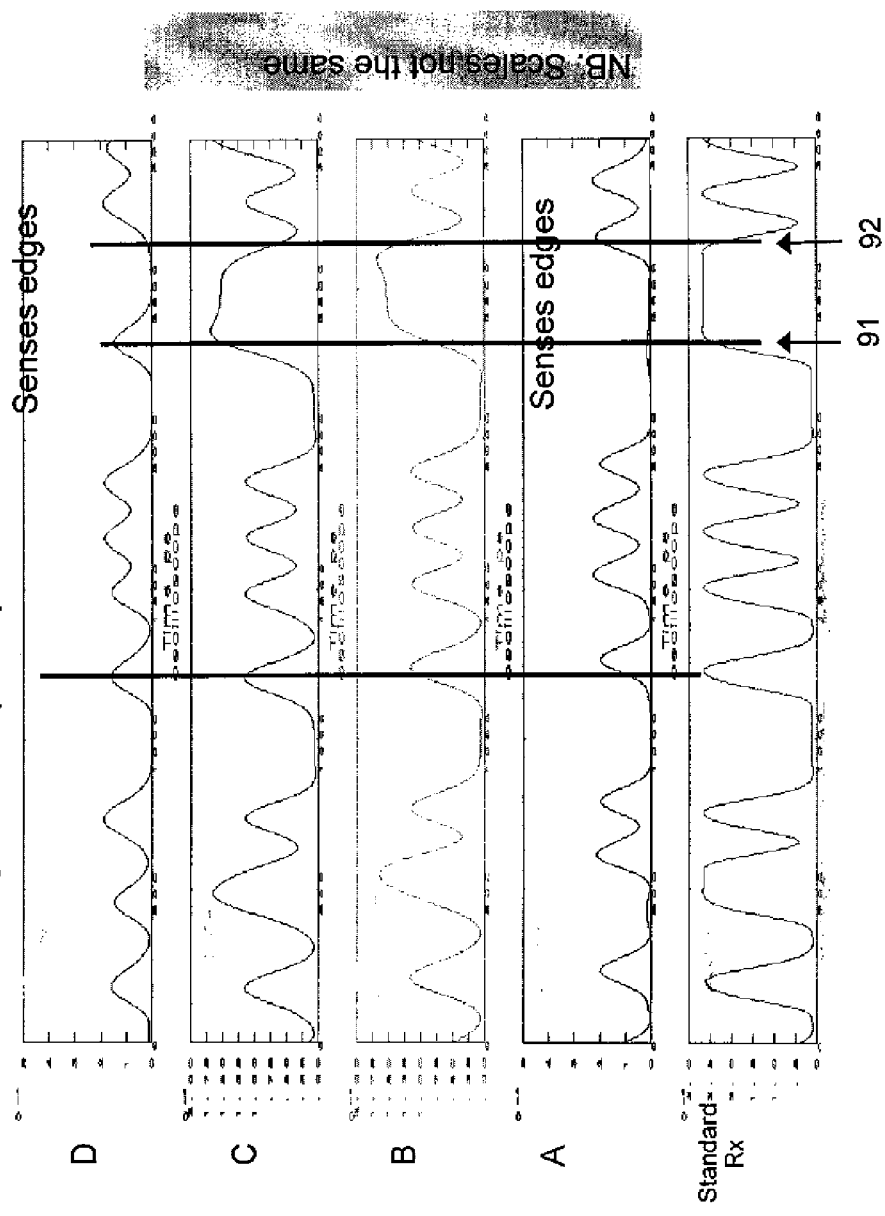

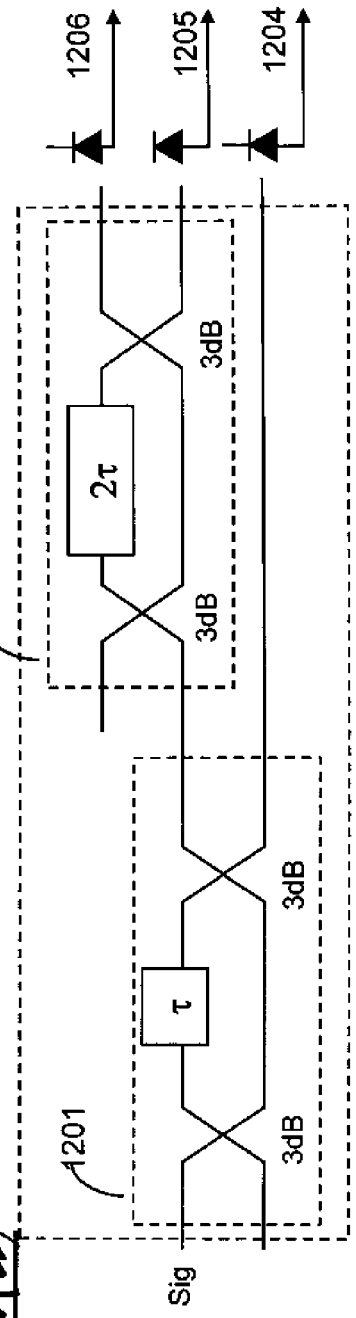
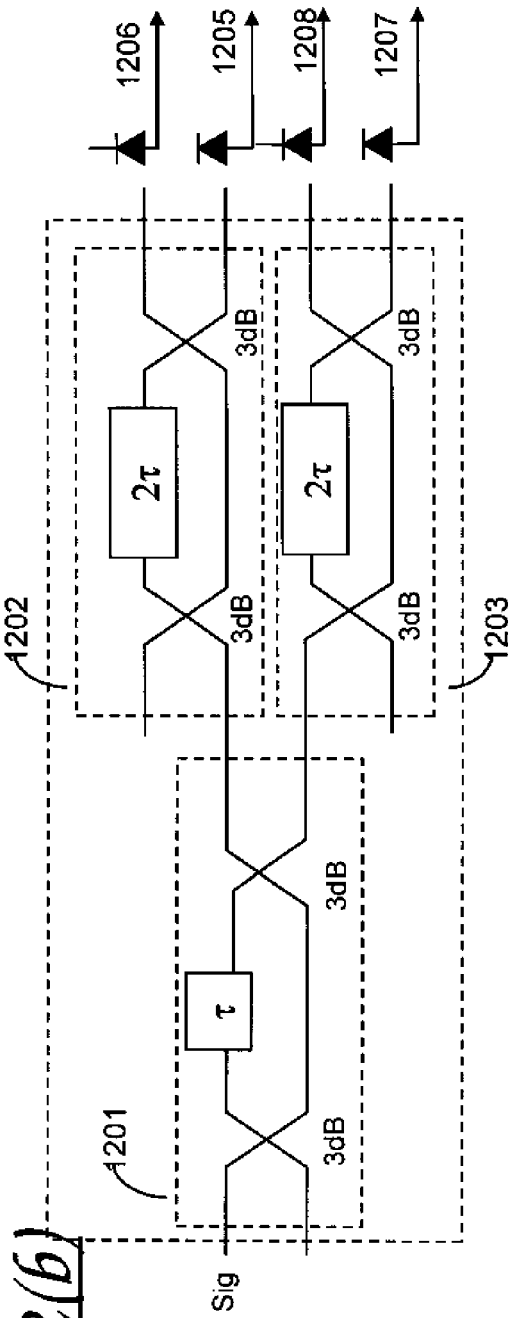
Fig. 12(a)
Fig. 12(b)

MULTI-DETECTOR DETECTION OF OPTICAL SIGNALS

FIELD OF THE INVENTION

The present invention relates to methods and apparatus for multi-detector detection of optical signals and systems incorporating the same. In particular, coherent detection and direct detection of optical signals of the kind employed in optical communications networks.

BACKGROUND TO THE INVENTION

It is known to use optical communications media to carry optically modulated data over great distances in communications networks. However, known optical media (for example optical fibres) are known to exhibit characteristics which limit the effective distance over which optical signals can be transmitted without requiring detection and regeneration in order to avoid irretrievable corruption of the modulated data. Such characteristics include both chromatic dispersion effects and polarisation mode dispersion (PMD) effects. Both of these effects effectively impose practical limits on the length of optical transmission media from which the optical signals can be recovered using known technology and at reasonable cost without suffering intolerable loss of data (whether through lack of reliability in the data recovered, or through total loss of the signal).

As a result of these effects, it is often necessary in an optical communications network to detect and to regenerate the modulated data at intermediate points between source and destination nodes, particularly where the source and destination nodes are a large distance apart. The optical receiving and re-transmission apparatus required at such intermediate points may be complex, costly, and bulky and require ongoing expense arising from powering costs and maintenance costs. The overall cost of this equipment is ultimately borne by the end-customers making use of such communications networks.

Two known forms of signal detection for such optical systems are coherent detection and direct detection.

In systems employing coherent detection, the transmitted signals may be transmitted over a broad band of frequencies. At the receiver, the signal—having been subjected to the degrading effects of dispersion as noted above—is combined with a local oscillator signal so as to extract the original signal. This offsets the received signal to a lower frequency band. Detection is then performed on the signal at the lower frequency band. However, the degrading effects of dispersion in the transmission medium which most affect coherent receivers arise as a result of the width of the frequency band rather than the individual frequencies themselves, and so this offset to lower frequencies, whilst retaining the information content of the signal, does not materially mitigate the effects of dispersion since the lower-frequency signal still requires at least the same width of band as the originally transmitted signal. The phase distortion damage is done during transmission, all coherent mixing down does, is to frequency shift that distorted information.

Known direct detection transmission systems are also limited by optical dispersion. Conventionally, this dispersion is compensated optically: high levels of dispersion cannot be compensated electronically after conversion from the optical domain by means of known methods using a single photo-detector to convert from optical domain to electrical domain.

It is therefore clearly desirable to provide improved methods and apparatus which will extend the effective reach of such optical transmission systems so as to reduce the requirement for such regeneration apparatus and thereby mitigate these disadvantages.

OBJECT OF THE INVENTION

The present invention therefore seeks to provide improved methods and apparatus for detecting optical signals, ideally mitigating one or more problems associated with the prior art.

SUMMARY OF THE INVENTION

The present invention is directed to the use of multiple detectors to separately detect respective multiple spectral modes (that is, subsets of the optical spectrum) of a received optical signal. The invention also provides for a corresponding multi-photodiode, dispersion-tolerant optical receiver.

According to a first aspect of the present invention there is provided a method of generating an output signal representative of an input optical signal comprising the steps of: generating a plurality of output optical signals, each representative of a distinct spectral mode of the input optical signal, from the input optical signal; separately converting each of the plurality of output optical signals into an output electrical signal, so as to provide a plurality of output electrical signals; and signal processing the plurality of output electrical signals by analysing more than on output electrical signal at more than on point in time.

The conversion may use photo-detectors or photo-diodes.

Advantageously, the output signal is derived from information from multiple detectors.

The step of signal processing may comprise the step of performing one of maximum likelihood sequence estimation and maximum a posteriori detection on the plurality of output optical signals.

The step of signal processing may comprise the steps of: transversal filtering each of the plurality of output optical signals to provide a plurality of filtered signals; and summing and thresholding the filtered signals.

The method may further comprise the step of optimising the bandwidth of the input optical signal. This is most useful for signals suffering high levels of chromatic dispersion. This enables the bandwidth of the fixed number of spectral modes to be changed so to optimise the performance. This may be implemented by filtering which may be performed in the transmitter, the receiver or anywhere within the communications link.

The spectral modes may be substantially mutually orthogonal. The term 'orthogonal' is used to mean that where two modes are perfectly orthogonal, neither mode contains a component of the other mode. However, in another example they may be non-orthogonal, such as where the modes are complementary. In the situation where the modulation format has spectral bands which contain correlated signal components, there will be complementary spectral modes which may be detected independently, e.g. upper and lower sidebands would carry information which is correlated for AM and anticorrelated for FM (frequency modulation).

The signal power of the input optical signal may be substantially evenly distributed between the spectral modes.

The spectral modes in combination may be substantially representative of the whole bandwidth of the input optical signal.

Alternatively, the spectral modes may not be representative of the whole bandwidth of the input optical signal. Advantageously, this could be used, for example, in high dispersion cases to allow a sacrificial mode or modes. That is, some of the information is intentionally discarded within a mode (a sacrificial mode) and the discarded information is inferred from the remaining data which is detected. This may be useful where there are insufficient spectral mode receivers to detect all the spectral modes without incurring a penalty due to the dispersion. However, were the sacrificial mode or modes detected instead of discarded, overall performance could still be improved.

The spectral modes may be frequency sub-bands of the input optical signal. The frequency sub-bands may be selected to avoid introducing stop-bands with respect to the frequency band of the input optical signal.

The frequencies within each frequency sub-band may be contiguous. The frequencies in any given sub-band need not all be contiguous however; sub-bands may alternatively be selected, for example, by comb filters.

The spectral modes may be arranged to be substantially symmetrical about the centre frequency of the signal.

The spectral modes may be arranged to be in complementary pairs, which are substantially symmetrically distributed about the centre frequency of the signal.

The spectral modes may be Fourier components of a frequency band associated with the input optical signal, or alternatively of a non-contiguous frequency band of the optical signal.

The spectral modes may be periodic but with spectral pitch which decreases with spacing from the centre frequency in order to match the effects of Chromatic Dispersion.

The spectral modes may be arranged to include a dominant spectral line or lines. This might be the carrier spectral line, or might be a spectral line or lines due to the clock rate in a return to zero suppressed carrier format.

The invention is also directed to corresponding apparatus comprising components for carrying out each of the steps of the methods.

The invention is also directed to an optical signal receiver comprising an input port at which to receive an input optical signal; a separator coupled to the input port and arranged to generate, responsive to the input optical signal, a plurality of output optical signals at respective output ports; a plurality of detectors, each coupled to one of the output ports; and a processor, arranged to generate an output signal representative of the input optical signal, where the value of said output signal at a point in time is determined from a plurality of amplitude determinations on a plurality of said output optical signals at a plurality of different times.

The separator may comprise at least one Mach-Zehnder interferometer and may comprise two or more Mach-Zehnder interferometers.

The invention also provides for a system for the purposes of communications which comprises one or more instances of apparatus embodying the present invention, together with other additional apparatus.

The invention also provides for computer software in a machine-readable form and arranged, in operation, to carry out every function of the apparatus and/or methods.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which:

FIG. 3($b$) shows a selection of spectral modes in accordance with one embodiment of the present invention;

FIG. 4($b$) shows a schematic graph of a base band response associated with a direct detector arrangement in accordance with the present invention;

FIGS. 7($a$) and 7($b$) show further embodiments of receivers in accordance with the present invention;

FIG. 9 shows an example of four different optical modes in accordance with the present invention;

FIGS. 11, 12($a$) and 12($b$) show schematic diagrams of still further embodiments of direct detectors in accordance with the present invention;

DETAILED DESCRIPTION OF INVENTION

In conventional direct detection systems utilising only a single photo-detector to detect the received optical signal, high levels of dispersion cannot be compensated electronically after photo-detection since some of the phase information is lost in the photo-detection process. Specifically, because optical dispersion causes a phase shift between upper and lower modulation sidebands of the received signal, the upper and lower modulation sidebands do not sum coherently. As a result, Amplitude Modulation (AM) of the transmitted signal becomes converted to Phase Modulation (PM) of the signal and vice versa.

The term 'detecting' or 'photo-detecting' is used herein to refer to the process of converting an optical signal from the optical to the electrical domain.

Figure 1:
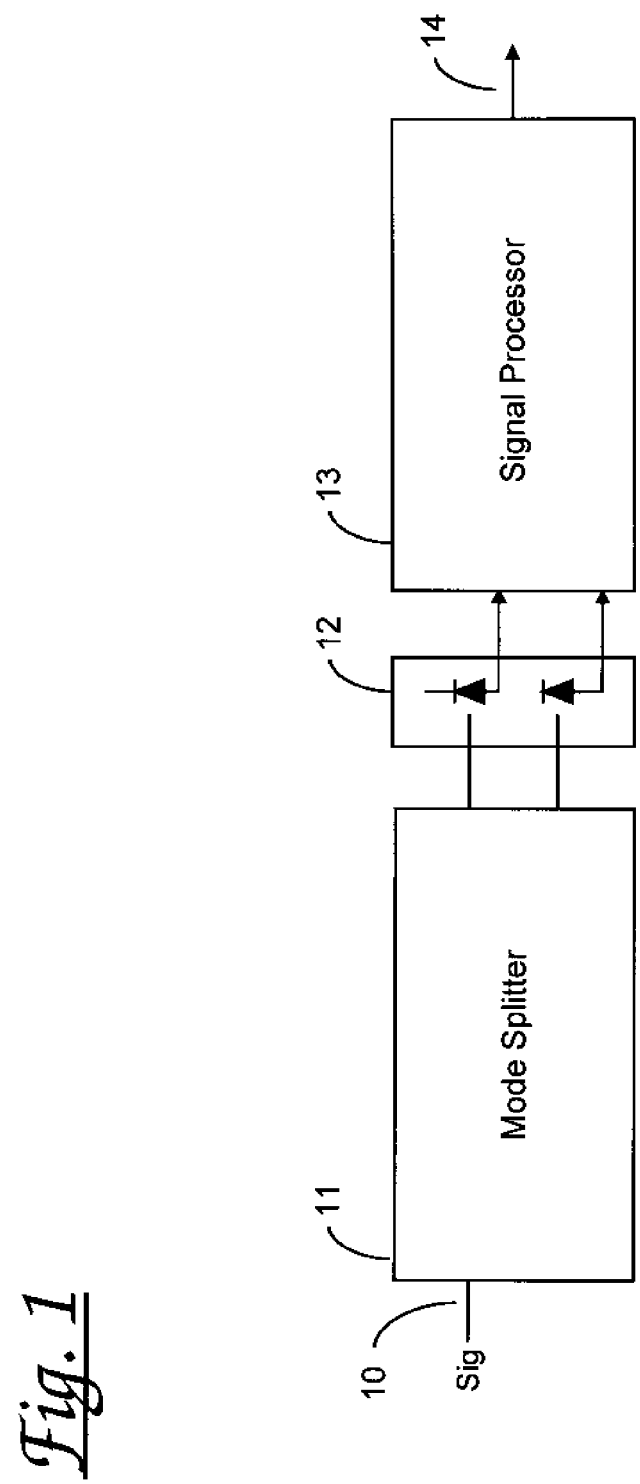
FIG. 1 shows a high-level schematic diagram of an optical signal receiver in accordance with the present invention.

Referring now to FIG. 1 there is shown a receiver arrangement according to the invention. The receiver arrangement comprises a mode splitter 11 arranged to receive an input optical signal 10 and to produce multiple output optical signals, derived from the input signal and corresponding to distinct optical modes of the input optical signal.

The modes (or spectral modes) may be of either or both of the following types:
1. They may be substantially mutually orthogonal, which means that when detected, they contain substantially independent parts of the information
2. They may be Complementary, which means they may contain similar information, either positively or negatively correlated.

These output optical signals are then separately detected using multiple photo-detectors 12 and the resulting electrical outputs fed to a signal processing unit 13 arranged to provide an output signal 14 representative of the input optical signal and derived from the plurality of inputs received from the photo-detectors.

The signal processing unit 13 makes a judgement on the correct logical state in one bit period based on amplitude measurements of signals from more than one spectral mode at more than one point in time. This may be more than one point in time within a single bit period or within multiple bit periods.

Where the spectral response of a spectral mode is discontinuous and includes more than one nonadjacent passband, there may be phase discontinuities of multiples of 2 Pi ($2\pi$), between these passbands. Consequently variable spectral mode filters, or redundant multiple different spectral mode filters, may be required so that it is possible us the output from one which is a good match to the dispersion characteristic of the fibre. These filters may be multipeak filters which are arranged to select out the parts of the spectrum which are in phase.

This enables addition of signals from both sides of a null (in the electrical spectrum) without them cancelling out.

Whilst dispersion during transmission causes information to be lost from the AM component of the signal, the information lost from the AM component is not entirely lost, but rather is converted to phase information and vice versa. When a single photodiode is used to demodulate a dispersed signal, information is lost when the upper and lower parts of the spectrum are superimposed without correction for the dispersion induced phase differences. The use of more than one photodiode, each acting on different spectral modes, enables information which would conventionally be lost, to be retained. In this way, by utilising more than the conventional one detector for direct detection, substantially more of the information modulated on the signal can be recovered in the presence of dispersion.

Figure 2:
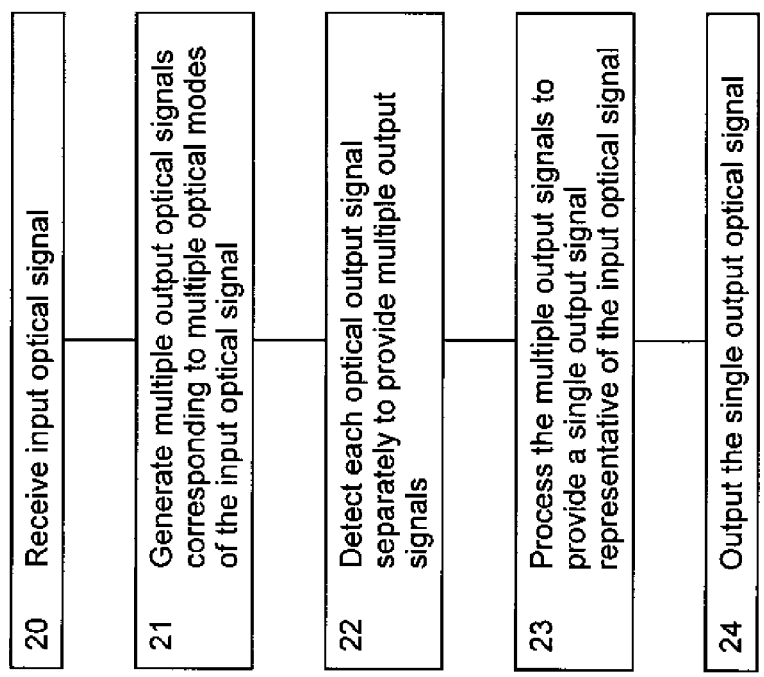
FIG. 2 shows an example method of signal detection in accordance with the present invention.

FIG. 2 shows the corresponding method steps 20, 21-24 corresponding to the apparatus elements 10, 11-14 shown in FIG. 1.

Whilst the example described above and the detailed examples below relate specifically to direct detection of optical signals, the general principle embodied in the invention is not limited to direct detection and may, in particular, also be applied to coherent detection.

The method is to resolve the received spectrum into multiple spectral modes. Ideally these modes are chosen to be mutually orthogonal and preferably with signal power distributed substantially evenly between the chosen modes.

Coherent detectors are then applied to each output optical signal representative of a spectral mode, and the complete signal decoded by using the outputs from all the coherent detectors. In principle, all signal information is therefore available to decode the signal. In practice, the multiple local oscillator signals required to operate the multiple coherent detectors may be provided from a single coherent optical local oscillator coupled to a comb generator.

The detected signal power in each of these modes is not binary, but rather may be multilevel or analogue in nature. The resulting detected signal power in each of the modes is much more resistant to dispersion than is the entire signal, since the bandwidth associated with each of the M modes is a fraction of the total signal bandwidth. Where the spectral response of a spectral mode is discontinuous and includes more than on nonadjacent passband, the optimum passband spectral bandwidth is approximately equal to the dispersion-limited bandwidth of the transmission system. The originally transmitted data can then be recovered using signal processing in the electrical domain of the output signals corresponding to the M modes. For example, transversal filters may be used together with maximum likelihood detection.

In this way, the effects of dispersion can be significantly mitigated using multiple lower-bandwidth receivers (enabling very high rate TDM). Such receivers may be used to construct extended reach, compensator-free transmission systems, and to enable greater compensation accuracy tolerance in compensated systems.

The method may be applied to multiple modulation formats, for example Amplitude Shift Keying (ASK) (as used, for example, in direct detection systems), Differential Phase Shift Keying (DPSK), or Frequency Shift Keying (FSK). The invention therefore provides a format-independent electronically configurable optical receiver.

Figure 3A:
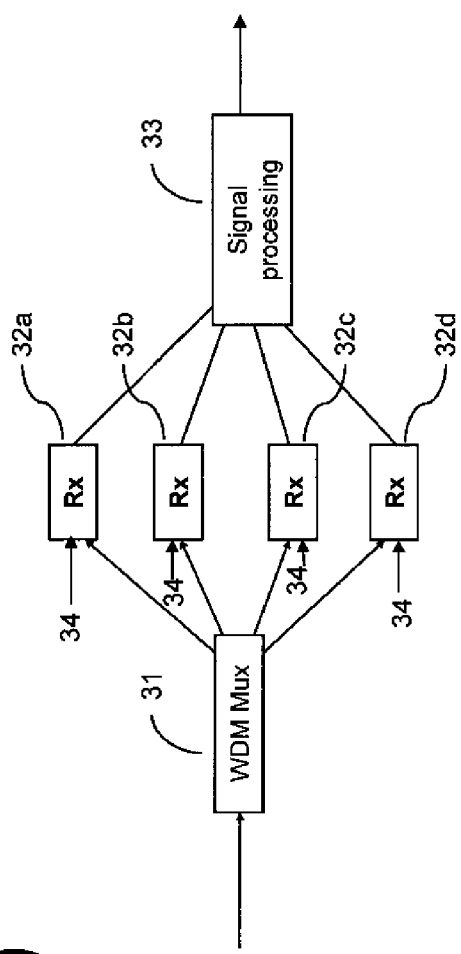
FIG. 3($a$) shows a schematic diagram of a coherent detector arrangement in accordance with the present invention.
Figure 3B:
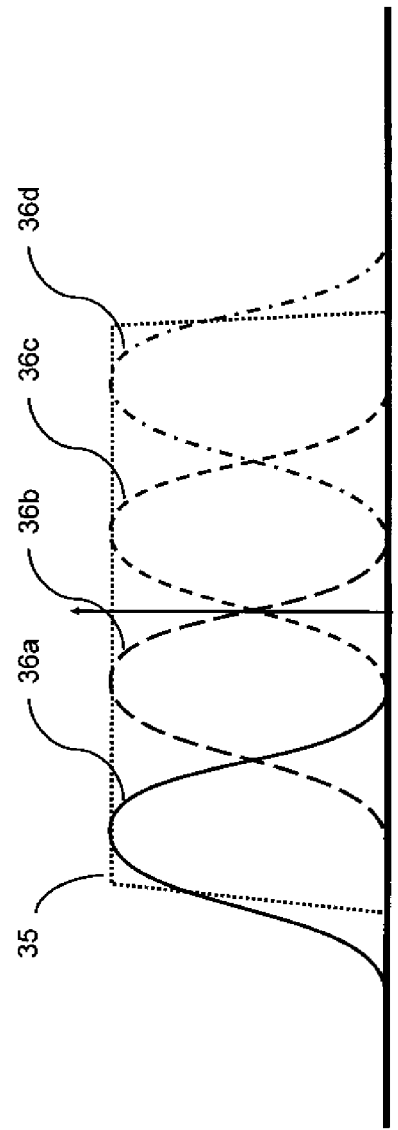

Referring now to FIGS. 3(*a*) and 3(*b*), one simple form of spectral mode which may be used is spectral slices. In the arrangement of FIG. 3(*a*), the received signal is passed via a WDM demultiplexer 31 to produce four outputs corresponding to four sub-bands of the transmitted signal spectrum. The received signal may be a broadband signal, such as a high bit rate TDM (time division multiplex) signal. A coherent receiver 32*a*-32*d* is provided for each such output and the resulting electrical signals, corresponding to the spectral slices produced by the WDM demultiplexer, fed to an electrical signal processor 33. Each coherent receiver may receive an input from a local oscillator 34. These local oscillator signals could all be provided by a single local oscillator which could use a comb generator as described above. Where more than one local oscillator is used, they must have a controlled frequency and phase relationship between them.

FIG. 3(*b*) shows how the receiver splits the signal spectrum 35 into multiple substantially orthogonal slices 36*a*-36*d*.

Note that, although in the embodiment illustrated each selected slice is contiguous, the partitioning of the signal spectrum is not constrained to be so. Alternative embodiments may used comb-like filtering to split the spectrum into non-contiguous slices. For example, spectral sub-bands 36*a* and 36*b* of the present embodiment may in another embodiment constitute a single non-contiguous sub-band, whilst bands 36*b* and 36*d* may constitute another non-contiguous sub-band.

Ideally all the signal energy is passed through the demultiplexer to the multiple detectors. In general it is also desirable that there be no stop bands between the selected modes so that there is no loss of information between receipt of the optical signal and the multiple detectors. Such an arrangement may be easily constructed using differential delays and couplers.

The following examples provide a more detailed description of the invention.

Figure 4A:
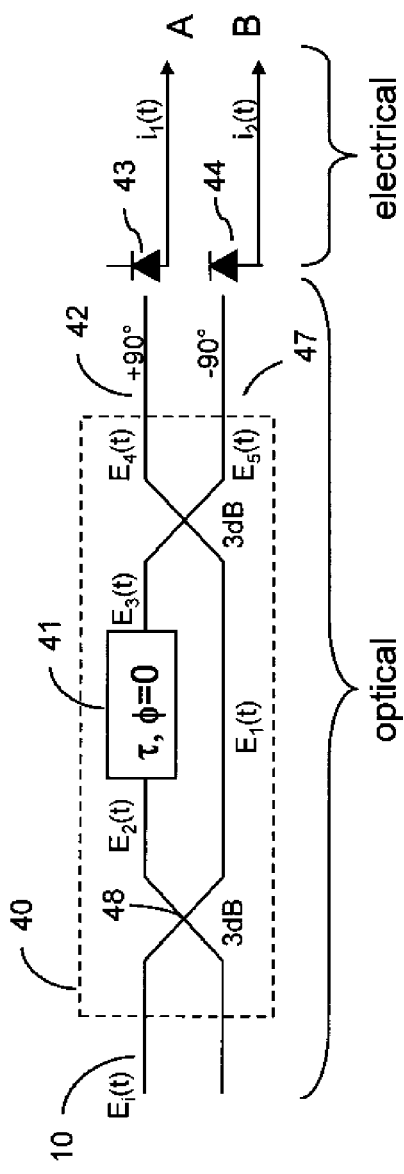
FIG. 4($a$) shows a schematic diagram of a first direct detector arrangement in accordance with the present invention.

Referring now to FIG. 4(a) a direct detector arrangement is shown comprising an optical medium (e.g. optical fibre) conveying a potentially dispersion-affected optical signal to a detector arrangement.

The detector arrangement comprises a differential delay Mach-Zehnder (MZ) interferometer 40 with two outputs 42, 47 and a characterised by a differential delay τ 41. The dispersion-affected optical signal is fed to one input arm 10 of the interferometer and the outputs provide two signals whose outputs correspond to input phase relationships of +90° and −90°. A photo-detector 43, 44 is provided to each output of the interferometer to detect each of the two optical outputs and convert them individually into the electrical domain for further processing.

The function of the interferometer is expressed in terms of the time delay τ, which includes a phase shift φ. The input electric field is split into two arms having fields $E_1$, and $E_2$ respectively:

$$E_1(t) = \frac{1}{\sqrt{2}} E_i(t) \quad [1]$$

$$E_2(t) = \frac{1}{\sqrt{2}} jE_i(t) \quad [2]$$

One arm is then delayed by time τ to give $E_3$ defined by:

$$E_3(t) = \frac{1}{\sqrt{2}} jE_i(t-\tau) \quad [3]$$

Both arms are then recombined so that the electric fields at the photo-detectors are:

$$E_5(t) = \frac{1}{2}[E_i(t) - E_i(t-\tau)] \quad [4]$$

$$E_4(t) = \frac{1}{2}j[E_i(t) + E_i(t-\tau)] \quad [5]$$

The currents at the photo-detectors are therefore:

$$i_1(t) = \frac{1}{4}\left[|E_i(t)|^2 + |E_i(t-\tau)|^2 + E_i(t)E_i(t-\tau)^* + E_i(t-\tau)E_i(t)^*\right] \quad [6]$$

$$i_2(t) = \frac{1}{4}\left[|E_i(t)|^2 + |E_i(t-\tau)|^2 - E_i(t)E_i(t-\tau)^* - E_i(t-\tau)E_i(t)^*\right] \quad [7]$$

Consequently the amplitude component of the field can be obtained from the sum of the currents, whilst the instantaneous frequency component can be obtained from the difference:

$$i_1(t) + i_2(t) = \frac{1}{2}\left[|E_i(t)|^2 + |E_i(t-\tau)|^2\right] \quad [8]$$

$$i_1(t) - i_2(t) = \frac{1}{2}\left[E_i(t)E_i(t-\tau)^* + E_i(t-\tau)E_i(t)^*\right] \quad [9]$$

Figure 5:
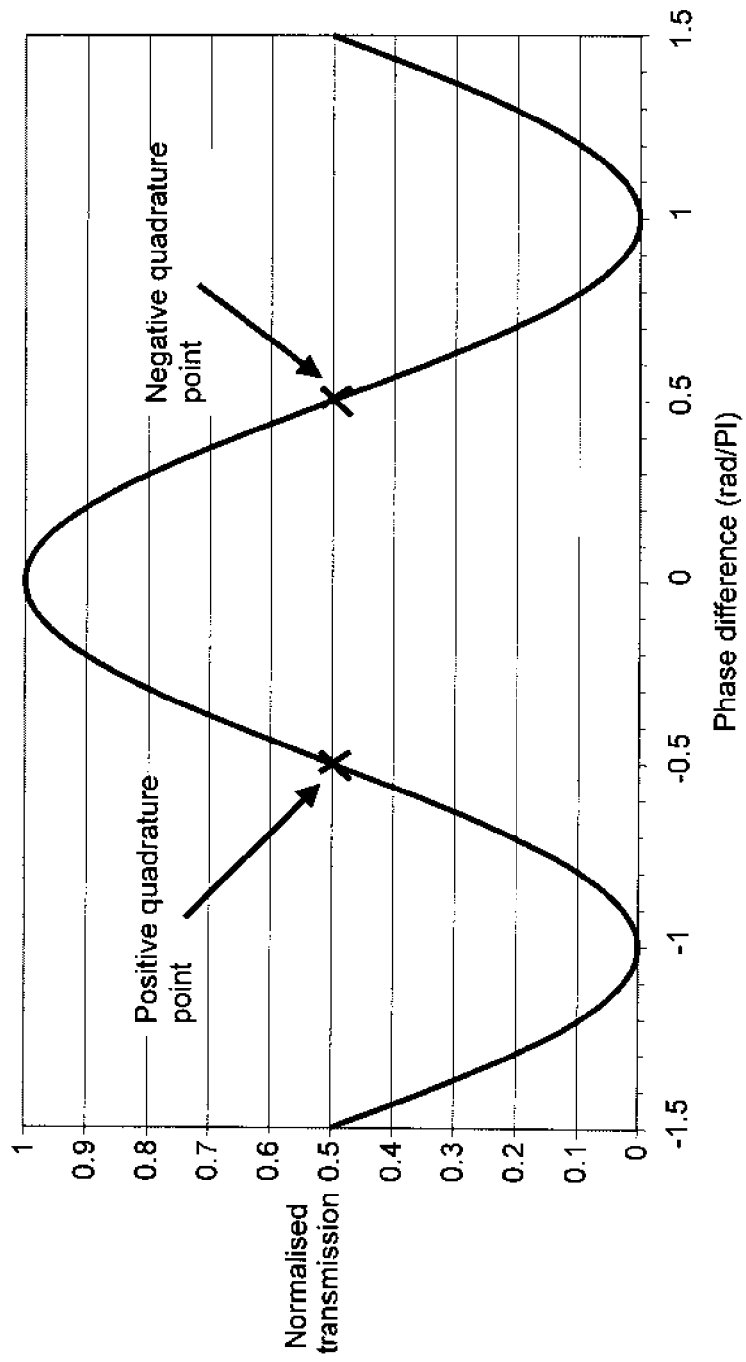
FIG. 5 shows a raised-cosine transfer function of a Mach-Zehnder interferometer versus phase difference between the two arms in accordance with the present invention.

The dynamic range of the interferometer is given by the Free Spectral Range (FSR). This is the maximum frequency range that can be unambiguously resolved and is one period on the transfer function shown in FIG. 5 which shows the raised-cosine transfer function of the Mach-Zehnder interferometer. The FSR is given by the reciprocal of the path delay time τ. For maximum sensitivity, an FSR appropriate to the expected frequency extent of the signal should be selected.

This may be illustrated by considering the case of the input to the receiver having the complex electric field envelope:

$$E_i(t) = A(t)\exp j(\omega t + \phi(t)) \quad [10]$$

Using a Taylor expansion for the field at t-τ:

$$E_i(t-\tau) = A(t-\tau)\exp j\left(\omega(t-\tau) + \phi(t) - \frac{d\phi}{dt}\tau\right) \quad [11]$$

The difference of the current at the receiver is therefore:

$$\begin{aligned}i_1(t) - i_2(t) &= \frac{1}{2}\left[E_i(t)E_i(t-\tau)^* + E_i(t-\tau)E_i(t)^*\right] \\ &= \frac{1}{2}A(t)A(t-\tau)\exp j\left(\omega\tau + \frac{d\phi}{dt}\tau\right) + \\ &\quad \frac{1}{2}A(t)A(t-\tau)\exp -j\left(\omega\tau + \frac{d\phi}{dt}\tau\right) \\ &= A(t)A(t-\tau)\cos\left(\omega\tau + \frac{d\phi}{dt}\tau\right)\end{aligned} \quad [12]$$

If the time delay τ is set such that ωτ=π/2+nπ, where n is an integer, then:

$$i_1(t) - i_2(t) = A(t)A(t-\tau)\cdot(-1)^{n+1}\cdot\sin\left(\frac{d\phi}{dt}\tau\right) \quad [13]$$

The difference current can therefore be used to obtain information on the instantaneous frequency difference dφ/dt.

Figure 4B:
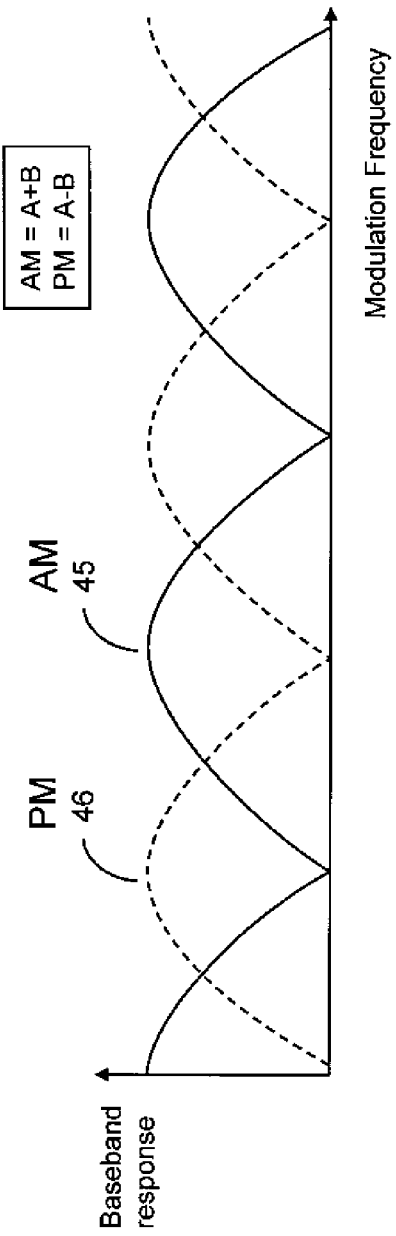

Referring now to FIG. 4(b), whilst dispersion during transmission causes information to be lost from the AM component 45 of the signal, the information lost from the AM component is not entirely lost, but rather is converted to phase information 46, and vice versa. In FIG. 4(a), the sum of the two output signals from the interferometer gives the AM component of the transmitted signal, whilst the difference between the two outputs gives the PM component. Consequently, since the phase component diminishes as the amplitude component grows, and vice versa, so the sum of the phase and amplitude components effectively captures— for each frequency in the transmitted band—significantly more of the information originally modulated on the signal. In this way, by utilising more than the conventional one detector for direct detection, substantially more of the information modulated on the signal can be recovered in the presence of dispersion.

Figure 6:
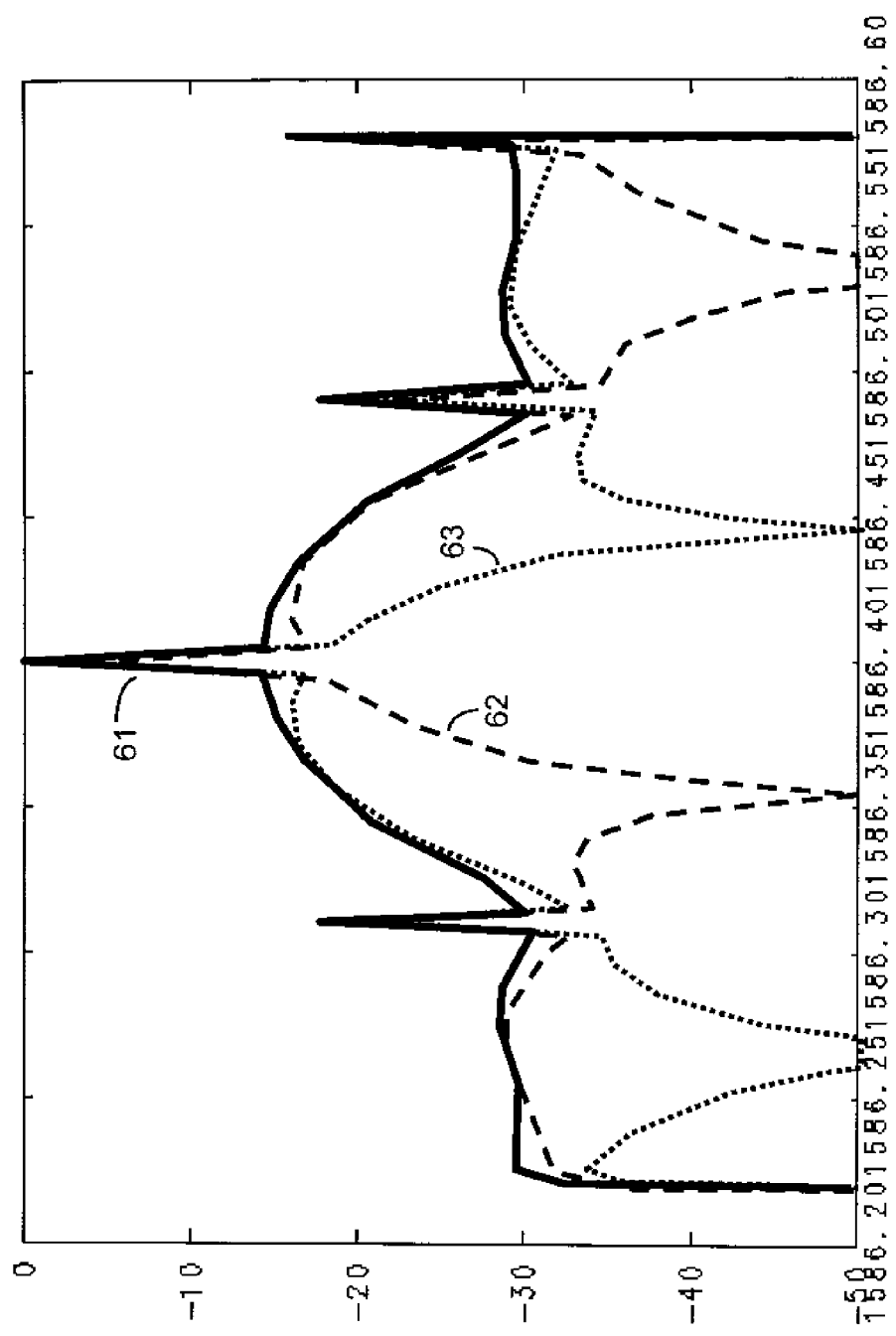
FIG. 6 shows an example optical spectra associated with a Mach-Zehnder interferometer, when biased to a quadrature point, arranged in accordance with the present invention.

FIG. 6 shows the input optical spectrum, and output optical spectrum from each arm of the Mach Zehnder interferometer (time delay=Bit Period/2; Phase delay=90, ASK data). The spectrum 61 (as before the interferometer) is split into two spectral modes labelled 62 and 63. At the photo-diode, the sidebands beat with the carrier, creating the baseband signal. By separating the modes before the detector, there is less phase distortion imposed by the dispersion since positive and negative frequencies are not significantly folded on top of each other. The signal processing algorithm (here transversal filters, followed by thresholding, or MLSE/MAP), make decisions based on both data streams.

Alternatively, Gaussian filters may be used to achieve similar results by separating the signal into two spectral modes.

In general terms, the method makes use of separate detection of multiple different spectral modes to effect recovery of the entire information content of the signal. In the embodiment described above referring to FIGS. 4(a) and 4(b), the spectral modes selected are the AM and PM components of the received signal. In other embodiments however, other spectral modes may be employed: for example, Fourier components of the band may be extracted to capture all the necessary data. In some modes (for example using Fourier components) it may be desirable to ensure power is equalised between the selected modes.

The arrangements of FIGS. 7(a) and 7(b) each comprise the interferometer arrangement of FIG. 4(a), coupled to a means for processing the multiple outputs from the multiple detectors.

In the embodiment of FIG. 7(a) the interferometer 40 splits the incoming light into two arms. One arm comprises an element 71 which introduces a fixed time delay and some means of controlling the phase difference between the signals on each arm. The outputs from the photo-detectors pass through filters 72, 73 and then are coupled by means of analogue-to-digital converters (not shown) to a Maximum Likelihood Sequence Estimator 74 (MLSE), thereby allowing information from each arm to be used in making decisions on the incoming signal.

Maximum likelihood detectors make decisions on sequences of bits (symbols) rather than making decisions based on individual bits. Ideally, given a set of samples of the received data sequence, x, it is desirable to select the symbol (S) that maximises the probability p(S|x) (the probability of symbol S given samples x). This is the maximum a posterori probability. Given noisy data samples, x, it is desired to select the symbol, S, which is most likely to have resulted in those noisy data samples.

If it is assumed that all symbols are equally likely (e.g. equal numbers of 0's and 1's, or equal numbers of 00, 01, 10, 11, etc), then Bayes law may be used to look for the symbol which maximises p(x|S). This is the Maximum Likelihood Sequence Estimator (MLSE). This is akin to searching through each symbol S, and selecting that which has the highest probability of generating the noisy data sample, x. It is equally valid to search for the symbol that maximises the log-likelihood probability—ln[p(x|S)], since the log function is monotonic.

If it is assumed that the noise on each sample is independent (this is not strictly true for fractional samples which may be correlated by the low pass electrical filter), then the log-likelihood breaks up into a sum of independent probabilities for individual bits:

$$\ln[p(x|S)] = \sum_k \ln[p(x_k|S)] \quad [14]$$

If the probability distribution for each bit of each symbol, S, is known, the total log-likelihood probabilities can be calculated and the most probable symbol can be selected.

The complexity of such an electrical receiver is similar to, if not simpler than, a receiver which uses fractional samples (e.g. 2 time samples/bit). However chromatic dispersion tolerance is improved in the present arrangement. A conventional 10 Gb/s receiver using an MLSE with fractional samples requires an analogue-to-digital converter running at 20 Gsamples/s, and an MLSE chip with twice the number of data lines as compared to an MLSE with 1 sample/bit. The present differential receiver by comparison requires two, lower speed analogue-to-digital converters operating at, for example, 10 Gsamples/s, and an MLSE with twice the number of input data lines as compared to an MLSE with 1 sample/bit).

Where the modulation format generates symmetrical sidebands about the centre frequency, the spectral modes may be arranged to be in complementary pairs, symmetrically distributed about the centre frequency of the signal.

Figure 8:
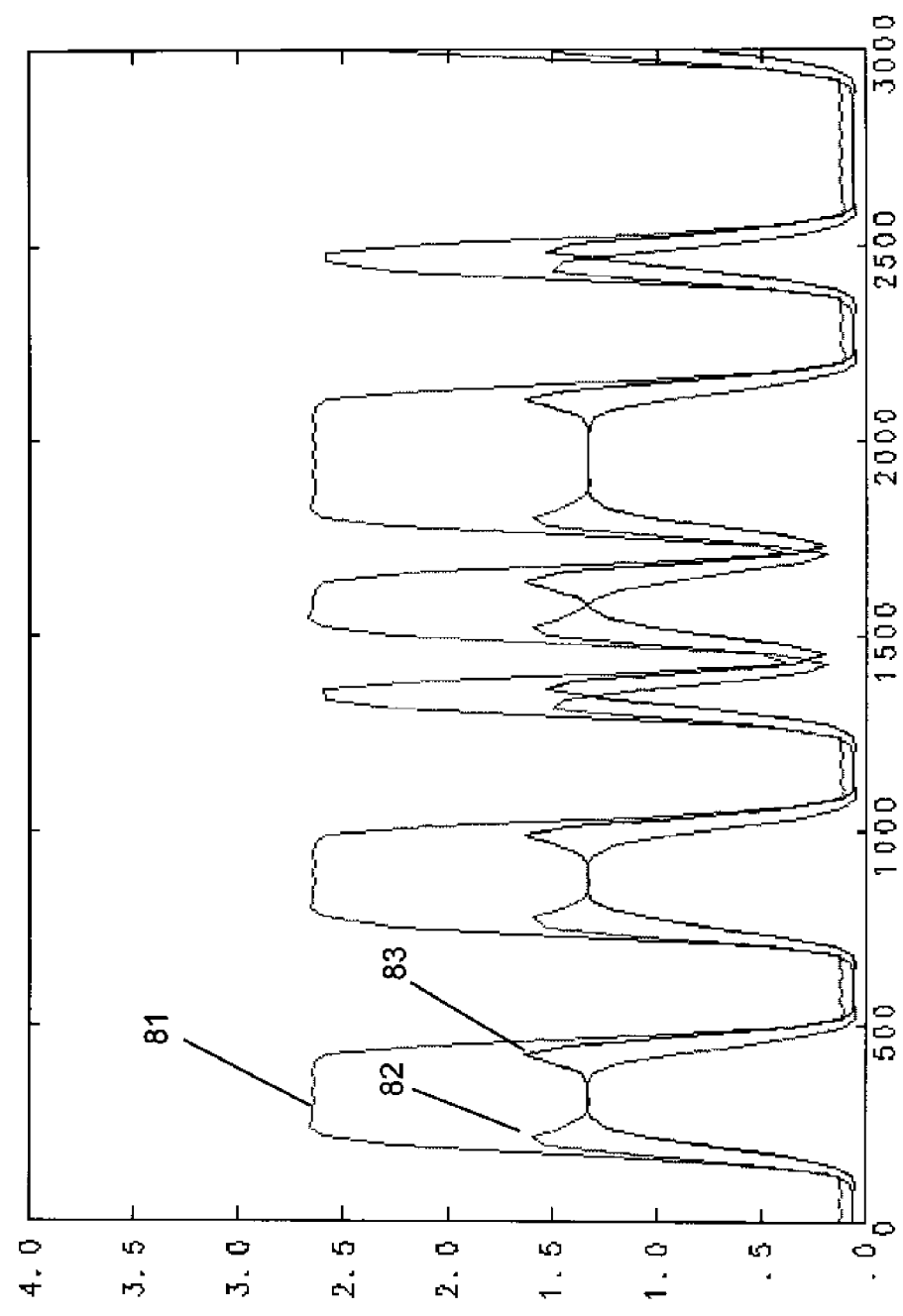
FIG. 8 shows an example of the output signals from two detected modes, (and the standard receiver signal for comparison) in accordance with the present invention.

It is possible to use correlation of signals from both spectral modes in the centre of the bit. Additionally, or alternatively, early and late samples of both spectral mode signals can be taken and then the differential between them used to provide additional information such as "bit change" information. FIG. 8 shows the waveform for such a case.

Detecting them gives a pair of signals, one which has a peak on the leading edge 82, and the other a peak on the trailing edge 83. As these two superficially identical signals exhibit significant differences on their leading and trailing edges, if additional signal samples are taken during these edges, they will provide improved signal detection (they provide additional "bit change" information), through the subsequent signal processing.

The fact that different signal modes contain different information is also shown in FIG. 9. FIG. 9 shows four spectral mode s A-D, where A and D are the outer channels and a comparison with the signal received by a standard receiver. It can be seen that all four channels are different and that the outer channels A and D contain pulses as indicators of 0-1 (see position 91) and 1-0 (se position 92) transitions respectively.

In a second embodiment shown in FIG. 7(b), a transversal filter 75, 76 may be used to process the output from each of the photo-diodes. This may be done in the analogue or digital domain. The resulting signal output from each arm is summed 77 and a simple decision threshold 78 applied to produce the output copy of the received signal. This type of receiver is considerably simpler than the maximum likelihood detector embodiment described above.

Figure 10A:
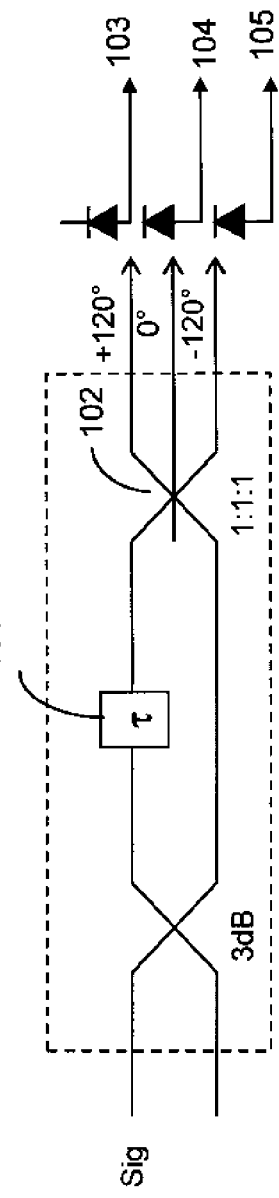
FIGS. 10($a$) and 10($b$) show schematic diagrams of further embodiments of direct detectors in accordance with the present invention.
Figure 10B:
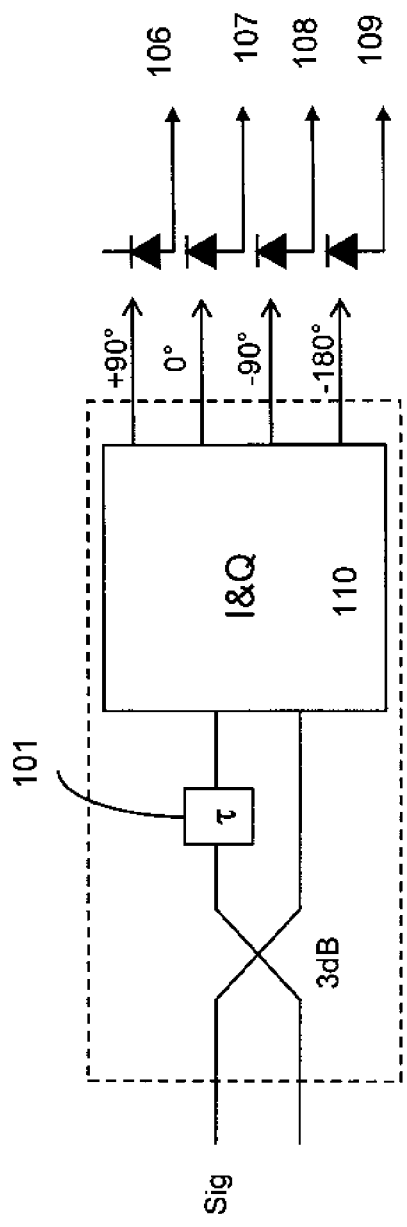

Referring now to FIGS. 10(a) and 10(b), it is noted that the configuration of the embodiment of FIG. 4(a) is sensitive to the precise value of the delay τ. This sensitivity can be overcome by increasing the number of spectral modes selected, and hence the number of output ports employed. This also allows operation at arbitrary channel frequencies.

The delay, τ, is typically T/2, where T is the bit period.

In the embodiment of FIG. 10(a) three output signals are provided by replacing the two-way split 48 of the embodiment of FIG. 4(a) by a three-way equal split 102 to provide outputs 103, 104, 105 corresponding to input phase relationships of +120°, 0°, and −120°.

FIG. 4(b) shows an embodiment having four outputs 106, 107, 108, 109 corresponding to to input phase relationships of +90°, 0°, −90° and +180°. In this instance it might not be necessary to provide all four outputs. The I&Q circuit 110 of FIG. 10(b) may also be implemented by an over-coupled three-fibre coupler as disclosed in co-pending U.S. patent application Ser. No. 10/185,136 filed Jun. 28, 2002. In this instance the over-coupled coupler would have a 1:2:2 power split to provide the necessary I and Q output components. The configurations such as shown in FIGS. 10(a) and 10(b), allow arbitrary effective filter tuning to be achieved, without requiring precise phase tuning of the delay element labelled $\tau$, as any virtual phase can be synthesised from the combination of the real and imaginary components.

Figure 11:
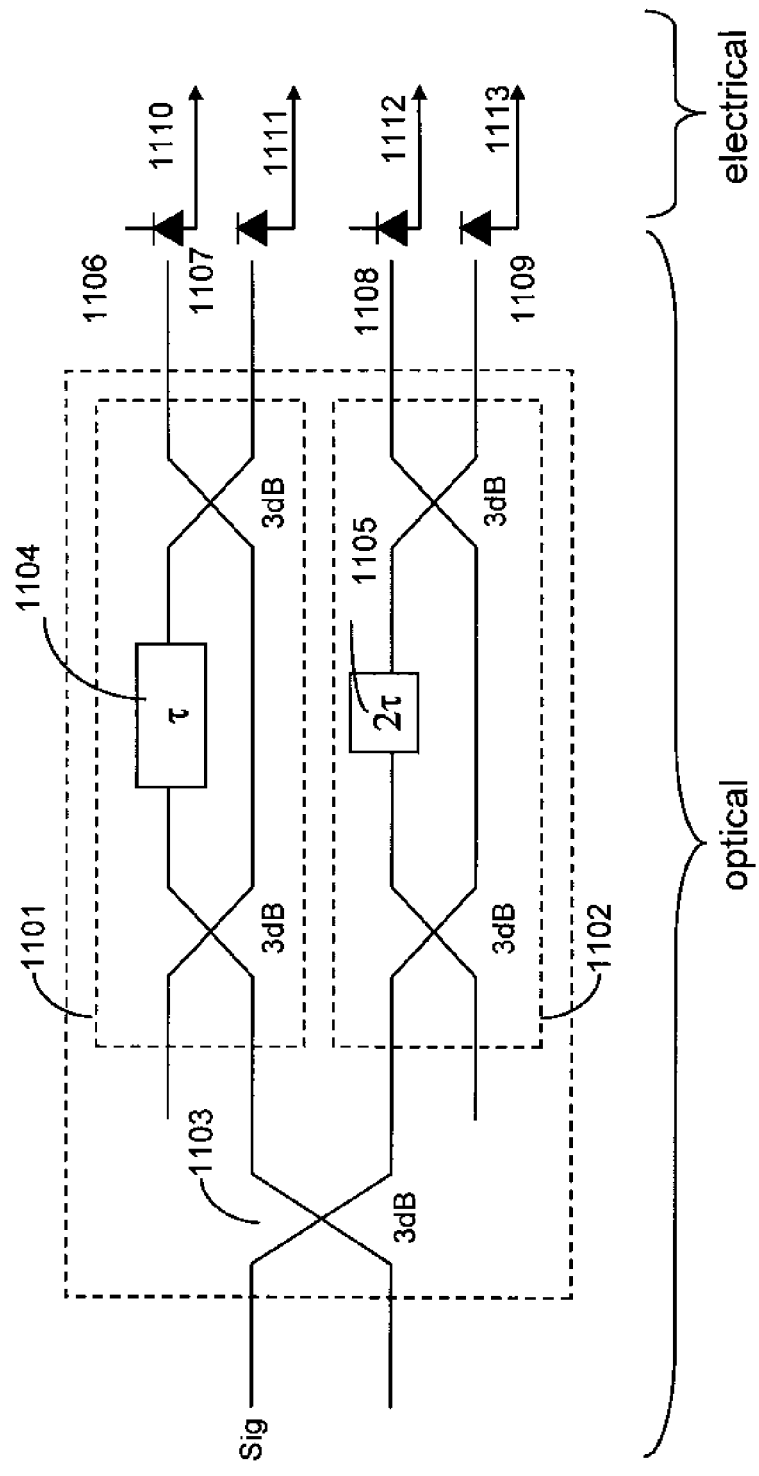

Turning now to the embodiment of FIG. 11, it is also possible to utilise multiple delay values 1104, 1105 rather than the single delay of the embodiments of FIGS. 4(a), 10(a), and 10(b). Specifically, the received signal may be initially split into two or more outputs and those outputs are then processed independently using any of the embodiments described above, not all of the differential delay interferometers utilising the same delay interval; and in at least one preferred arrangement, each interferometer utilises a different delay.

In the specific arrangement shown, and initial splitter 1103 produces two outputs each of which is fed to a differential delay interferometer, the first 1102 having a differential delay of $\tau$, whilst the second 1101 has a differential delay of $2\tau$ where $\tau=T/2$ where T is the bit period. The T/2 delay enables discrimination between the upper and lower sidebands in the received signal. Each interferometer is arranged to provide two outputs, giving a total, in this arrangement, of four outputs 1106-1109 each having its own photo-detector 1110-1113 to convert the optical output to the electrical domain. This arrangement may be thought of as being optimised for particular bit patterns.

FIGS. 12(a) and 12(b) show alternative arrangements to that of FIG. 11, in which multiple interferometers 1201, 1202, having distinct delay values, are arranged in series rather than in parallel. In the specific example illustrated in FIG. 12(a), a first interferometer 1201 has a delay of $\tau$. One input to a second interferometer 1202, having a delay of $2\tau$, is coupled to one of the outputs of the first interferometer. In this arrangement, three photo-detectors 1204, 1205, 1206 are used: a first 1204 coupled to the second output from the first interferometer, with second and third detectors 1207, 1208 coupled to the two outputs from the second interferometer 1202.

Figure 13:
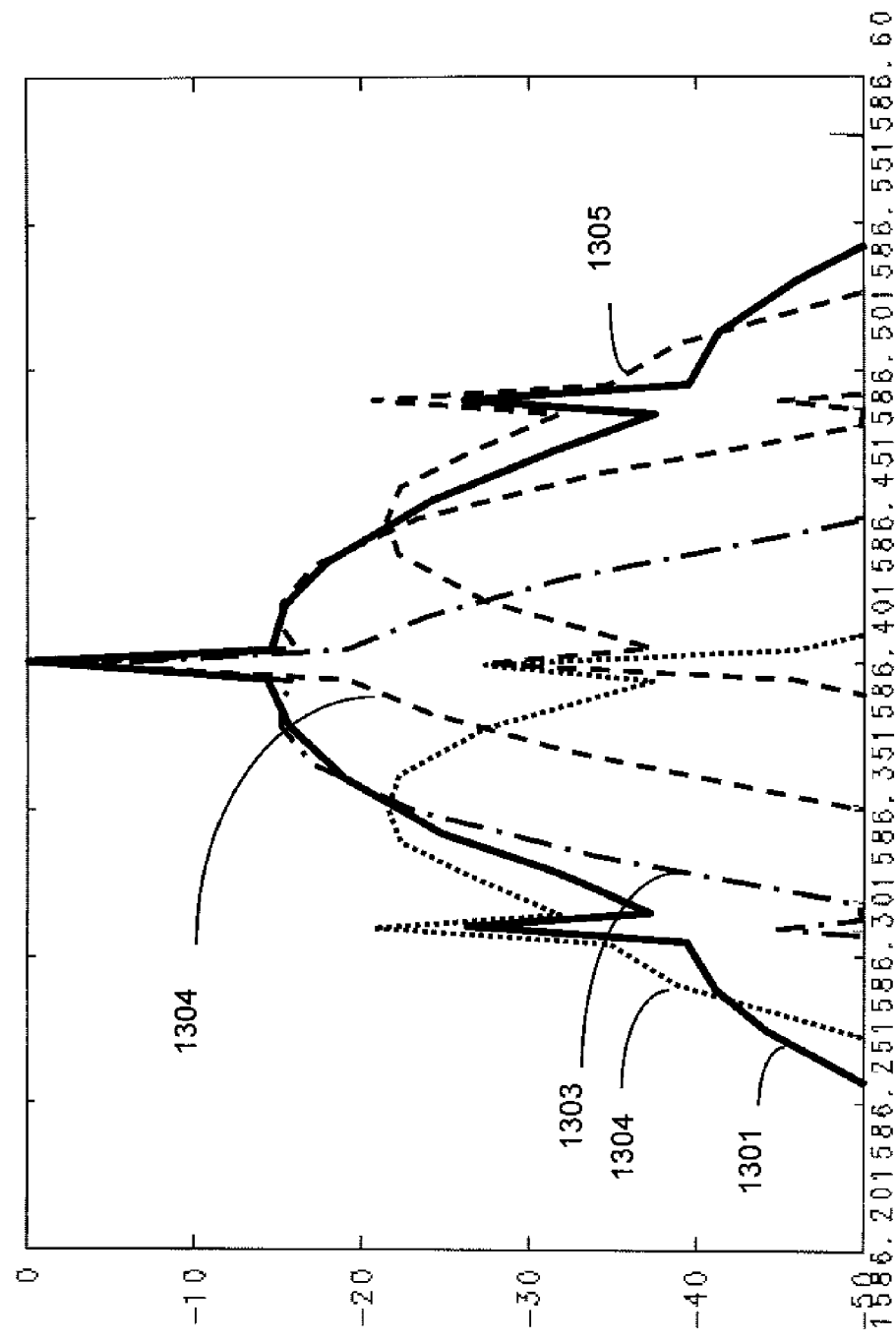
FIG. 13 shows an example optical spectra associated with a double Mach-Zehnder interferometer configuration arranged in accordance with the present invention.

In the further alternative arrangement shown in FIG. 12(b), the first detector 1204 of FIG. 12(a) is replaced by a further interferometer 1203 and two-detector arrangement 1207, 1208 similar to that coupled to the first output from the first interferometer of FIG. 12(a). This arrangement supports use of four detectors 1205-1208. FIG. 13 shows the spectrum that would be obtained from the arrangement in FIG. 12(b). The spectrum 1301 (from before the interferometers) is divided into four spectral modes 1302, 1303, 1304, 1305.

Figure 14:
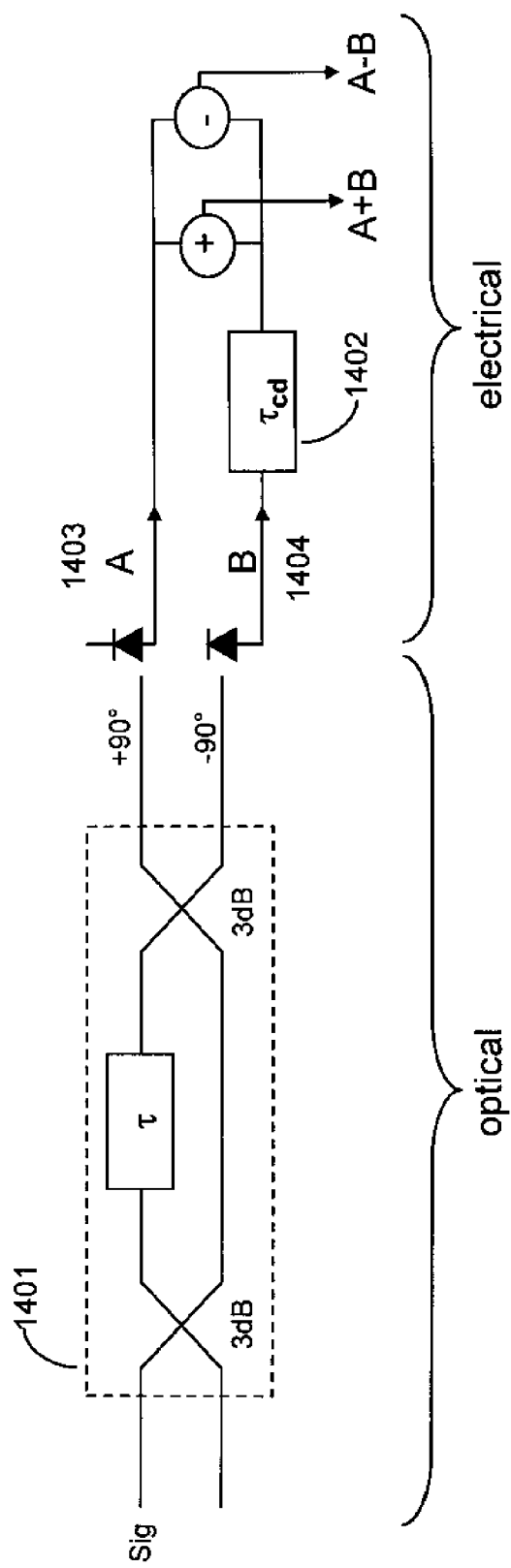
FIG. 14 shows a schematic diagram of a further embodiment of direct detectors in accordance with the present invention.

Referring now to FIG. 14, an alternative approach is to use differential delay to separate the upper and lower sidebands of the received signal and then to detect the two optical output signals and perform the remaining processing in the electronic domain. Specifically the arrangement shows a differential delay interferometer 1401, with delay of T/2, arranged to provide two output signals characteristic of the upper and lower sidebands respectively of the received signal. A pair of photo-detectors 1403, 1404 converts the outputs to the electrical domain in which a further differential delay 1402, $\tau_{cd}$, to compensate for chromatic dispersion induced delay is included. The underlying concept here is that the signal is split into multiple optical bands each of which is differentially delayed due to chromatic dispersion in the transmission fibre. This differential delay may be removed or compensated for by introducing compensating differential delays 1402 in either the optical path before a photodiode, or the electrical path after a photodiode.

Any range or device value given herein may be extended or altered without losing the effect sought, as will be apparent to the skilled person for an understanding of the teachings herein.

The invention claimed is:

1. A method of generating an output signal representative of an input optical signal comprising the steps of:
generating a plurality of output optical signals, each representative of a distinct spectral mode of the input optical signal, from the input optical signal;
separately converting each of the plurality of output optical signals into an output electrical signal, so as to provide a plurality of output electrical signals; and
signal processing the plurality of output electrical signals to derive the ouput signal with correction for dispersion induced phase differences, based on more than one of the output electrical signals.

2. A method according to claim 1 in which the step of signal processing comprises the step of:
performing one of maximum likelihood sequence estimation and maximum a posteriori detection on the plurality of output optical signals.

3. A method according to claim 1 in which the step of signal processing comprises the steps of:
transversal filtering each of the plurality of output optical signals to provide a plurality of filtered signals;
summing and thresholding the filtered signals.

4. The method of claim 1, the signal processing step involving deriving the output signal at a given point in time, from more than one of the output electrical signals at more than one point in time.

5. A method according to claim 1 in which the spectral modes are substantially mutually orthogonal.

6. A method according to claim 1, in which the spectral modes are complementary.

7. A method according to claim 1 in which the signal power of the input optical signal is substantially evenly distributed between the spectral modes.

8. A method according to claim 1 in which the spectral modes in combination are substantially representative of the whole bandwidth of the input optical signal.

9. A method according to claim 1 in which the spectral modes in combination are not representative of the whole bandwidth of the input optical signal.

10. A method according to claim 1 in which the spectral modes are frequency sub-bands of the input optical signal.

11. A method according to claim 10 in which the frequency sub-bands are selected to avoid introducing stop-bands with respect to the frequency band of the input optical signal.

12. A method according to claim 10 in which frequencies within each frequency sub-band are contiguous.

13. A method according to claim 1, said input optical signal having a centre frequency in which the spectral modes are arranged to be substantially symmetrical about the centre frequency of the signal.

14. A method according to claim 1, said input optical signal having a centre frequency, in which the spectral modes are arranged to be in complementary pairs, which are substantially symmetrically distributed about the centre frequency of the signal.

15. A method according to claim 1 in which the spectral modes are:
Fourier components of a frequency band associated with the input optical signal.

16. A method according to claim 1 in which the spectral modes are: Periodic but with spectral pitch which decreases with spacing from the centre frequency.

17. A method according to claim 1 wherein the spectral modes are each arranged to include a dominant spectral line or lines.

18. An optical signal receiver comprising:
- an input port at which to receive an input optical signal;
- a separator coupled to the input port and arranged to generate, responsive to the input optical signal, a plurality of output optical signals at respective output ports, each of the output optical signals being representative of a distinct spectral mode of the input optical signal;
- a plurality of detectors, each coupled to one of the output ports; and
- a processor, arranged to generate an output signal representative of the input optical signal, with correction for dispersion induced phase differences, based on a plurality of said output optical signals.

19. An optical signal receiver according to claim 18 in which the separator comprises:
- at least one Mach-Zehnder interferometer.

20. An optical signal receiver according to claim 19 in which the separator comprises:
- two Mach-Zehnder interferometers.

21. The receiver of claim 18, the signal processor being arranged to derive the output signal at a given point in time, from more than one of the output electrical signals at more than one point in time.

* * * * *